(12) United States Patent
Niebling et al.

(10) Patent No.: US 7,413,349 B2
(45) Date of Patent: Aug. 19, 2008

(54) WHEEL BEARING UNIT

(75) Inventors: Peter Niebling, Bad Kissingen (DE);
Ernst Masur, Untereuerheim (DE);
Gottfried Ruoff, Oberwerrn (DE)

(73) Assignee: Fag Kugelfischer AG (DE)

( * ) Notice: Subject to any disclaimer, the term of this patent is extended or adjusted under 35 U.S.C. 154(b) by 235 days.

(21) Appl. No.: 11/283,234

(22) Filed: Nov. 18, 2005

(65) Prior Publication Data

US 2006/0120650 A1 Jun. 8, 2006

Related U.S. Application Data

(60) Provisional application No. 60/655,337, filed on Feb. 22, 2005.

(30) Foreign Application Priority Data

Nov. 18, 2004 (DE) .................. 10 2004 055 786

(51) Int. Cl.
*F16C 13/00* (2006.01)
*F16C 19/00* (2006.01)
(52) U.S. Cl. .................. 384/544; 384/586; 384/589
(58) Field of Classification Search ......... 384/543–545, 384/448, 499, 512, 537, 548, 585, 589
See application file for complete search history.

(56) References Cited

U.S. PATENT DOCUMENTS

| 4,465,326 | A | * | 8/1984 | Guimbretiere | ............... 384/544 |
|---|---|---|---|---|---|
| 4,765,688 | A | * | 8/1988 | Hofmann et al. | ............ 384/544 |
| 5,114,247 | A | * | 5/1992 | Folino | ......................... 384/461 |
| 5,458,352 | A | * | 10/1995 | Lederman | .................... 384/499 |
| 5,536,098 | A | * | 7/1996 | Schwarzler | ................. 384/544 |
| 5,975,767 | A | * | 11/1999 | Mizukoshi et al. | .......... 384/544 |
| 6,135,571 | A | * | 10/2000 | Mizukoshi et al. | .......... 384/544 |
| 6,428,214 | B2 | * | 8/2002 | Tajima et al. | ............... 384/544 |
| 6,497,515 | B1 | * | 12/2002 | Sahashi et al. | .............. 384/544 |
| 6,551,190 | B2 | * | 4/2003 | Hofmann et al. | ............ 384/544 |
| 6,626,580 | B2 | * | 9/2003 | Tajima et al. | ............... 384/544 |
| 2003/0048967 | A1 | * | 3/2003 | Sahashi et al. | .............. 384/544 |

FOREIGN PATENT DOCUMENTS

DE 4210461 A1 * 10/1993
GB 2246187 A * 1/1992

* cited by examiner

*Primary Examiner*—Marcus Charles
(74) *Attorney, Agent, or Firm*—Ostrolenk, Faber, Gerb & Soffen, LLP

(57) ABSTRACT

A wheel bearing unit having at least one outer part, at least one inner part and having at least two rows of rolling elements between the outer part and the inner part, on the outer part at least one inner raceway, and on the inner part at least one outer raceway for the rolling elements of a row.

8 Claims, 2 Drawing Sheets

WHEEL BEARING UNIT

CROSS REFERENCE TO RELATED APPLICATIONS

This application claims the benefit of the United States Provisional Patent Application No. 60/655,337 filed on 22 Feb. 2005 and German Application No. 10 2004 055 786.1, filed Nov. 18, 2004, the disclosures of which is hereby incorporated by reference.

FIELD OF THE INVENTION

The invention relates to a wheel bearing unit having at least one outer part, at least one inner part and having at least two rows of rolling elements between the outer part and the inner part, on the outer part at least one inner raceway respectively being configured, and on the inner part at least one outer raceway for the rolling elements of a row respectively being configured.

BACKGROUND TO THE INVENTION

Known wheel bearing units have a relatively high weight and a relatively low bearing stiffness. The bearing stiffness is here the resistance which the unit puts up against elastic deflections provoked by loads. From the bearing stiffness a tilt stiffness results, which derives from the ratio of load-generated moments to the tilt angle in the bearing, e.g. in Nm/°. The more the bearing tilts under loads, i.e. the greater is the tilt angle under equal load, the lesser is this tilt stiffness. The loads are the loads which essentially act upon a vehicle wheel and the associated wheel suspension in the running state of a vehicle. The lower the bearing stiffness, the more the loads induce tiltings of the wheel system, which adversely affect the driving characteristics of the vehicle, especially when cornering, and adversely affect brake wear and brake functioning.

SUMMARY OF THE INVENTION

The object of the invention is therefore to provide a wheel bearing unit having a high bearing stiffness.

The object has been achieved with the subject of the characterizing part of claim 1, in that the ratio of the pitch circle diameter $T_K$ of a row of rolling elements of the wheel bearing unit to the diameter $d_K$ of the rolling elements is greater than the numerical value 6. Thus:

$$T_K > 6 \cdot d_K$$

on the following marginal conditions:
  The pitch circle is the imaginary circle, the center point of which is pierced perpendicularly by the rotation axis of the wheel bearing unit and which, on the peripheral side, intersects or joins the centers of the rolling elements of a row.
  The ratio applies, in wheel bearing units in which the diameters of the pitch circles differ from row to row, to the row having the smallest pitch circle diameter.
  The ratio applies, for wheel bearing units in which the diameters of the pitch circles are the same from row to row yet the diameters of the rolling elements differ from row to row, to the row whose rolling elements have the largest diameter.
  The ratio applies to wheel bearing units for the support of non-driven or driven wheels. Driven wheels are coupled, for example, to the joint outer part of a constant-velocity joint, such as steered wheels on vehicles with front-wheel drive or driven wheels on rear axle constructions.
  The ratio applies to single-row, especially double-row and multi-row ball or roller bearings, especially to ball bearings of which, generally, the inner part is connected to the vehicle wheel and the outer part is fixed in place on the vehicle side by means of wheel carriers or steering knuckles.
  The inner part is at least one inner ring having at least one of the raceways, is optionally two inner rings in a unit comprising a hub or the like on which the inner ring is seated, or
  The inner part is a hub or the like on which at least one of the raceways is directly, and thus without the interposition of an inner ring, configured.
  The outer part is at least one outer ring which is fitted to form a unit with an outer housing. The outer housing is, for example, a wheel carrier and has fastening elements for fastening on the vehicle side, or
  The outer part is the outer housing and has at least one of the raceways and is thus configured without the interposition of an outer ring.

With the choice of the ratio, there is a departure from the opinion prevailing amongst experts that the dimensions of wheel bearing units must be chosen as small as possible. As a result of the larger rolling element pitch circle, and assuming the same static rated load $C_0$ relative to a bearing of the prior art, $$C_0 = f_0 \cdot i \cdot z \cdot d_K^2 \cdot \cos \alpha_0$$

yields a larger number of balls per row for the bearing according to the invention, especially if the ball diameter $d_K$ is chosen as small as possible, wherein:

$f_0$=factor dependent upon the bearing construction
i=number of rows of rolling elements
$\alpha_0$=bearing pressure angle
z=number of rolling elements.

The stiffness is dependent upon factors such as the modulus of elasticity of the roller bearing material, the osculation of the raceway and, to a large degree, upon the number of rolling elements, as well as upon the diameter of the rolling elements. Thus, for example, for a bearing having a pitch circle diameter of $T_K$=64 to 65 mm and for z=14 rolling elements with $d_K$=12.7 mm in a bearing according to the prior art, a lower stiffness is obtained than an advantageously higher stiffness which is obtained for the wheel bearing unit according to the invention having the same pitch circle diameter and for z=21 with $d_K$=11.112 mm.

The bearing stiffness, which is markedly increased as a result of the invention by about 40% relative to the prior art, leads to increased bearing tilt stiffness. The increased bearing tilt stiffness leads to lower load-dependent deformations on the wheel bearing unit and thus to lower deformations on the brake disks.

One embodiment of the invention provides that the row spacing $r_L$ between two axially adjoining rows (the axial center-to-center distance from rolling element center to rolling element center) corresponds to at least 1.22 times the diameter $d_K$ of the rolling elements. Thus:

$$r_L \geq 1.22 \cdot d_K$$

It is further provided that the axial bearing width $b_L$ of the outer part is at least three times the diameter of the smallest supporting rolling element of the wheel bearing unit. Thus:

$$b_L \geq 3 \cdot d_K$$

on the following marginal conditions:
  The axial bearing width of the outer part is configured by the greatest distance, equidirectional with the rotation axis and parallel to the rotation axis, between the two points on the outer contour of the outer part which are distanced farthest apart in the same direction, points preferably being configured on the end faces of the outer ring which are configured facing away from each other and generally in a ring shape.

The axial bearing width of the outer part can be larger or smaller than that of the inner part.

Finally, with one embodiment of the invention, it is provided that the bearing cross section $q_L$ corresponds to at least 1.5 times the diameter of the smallest rolling elements of the wheel bearing unit. Thus:

$$q_L \geq 1.5 d_K$$

on the following marginal conditions:

The bearing cross section is determined by the radial distance between the bearing bore, described with the internal diameter $d_L$ (free internal diameter of the inner part), and by the diameter $D_A$ of the outer part, or, in the case of a non-rotationally symmetric outer part, by the smallest radial distance $D_A$ between two points $P_1$ and $P_2$ on the outer contour of the outer part, which points are situated one opposite the other on the rotation axis, and is obtained from $$2q_L = D_A - d_L.$$

The points $P_1$ and $P_2$ here lie in a common radial plane E running through the centers of the rolling elements of one of the rows. The radial plane E runs through the row which produces the smallest radial distance $D_A$. In the examples according to FIGS. 2 and 3, this is, for the wheel bearing unit 1 according to FIG. 2, the row on the right in the drawing and, for the wheel bearing unit 4 according to FIG. 3, the row on the left in the diagram.

A further embodiment of the invention provides for a wheel bearing unit having a wheel hub in that the diameter $d_z$ of the tip circle of the inner toothing corresponds at least to the dimension of the axial bearing width of the outer part. Thus:

$$d_z \geq 1 \cdot b_L$$

on the following marginal conditions:

For definition of the axial bearing width, see above;

The wheel hub has an inner toothing, projecting radially inward in the direction of the rotation axis. The inner toothing is designed for engagement in an outer toothing of a drive journal or the like. The wheel hub is at least coupled in a rotationally fixed manner to the outer raceway, i.e. either the wheel hub is the inner part itself and then has at least one of the raceways, or at least one inner ring sits as an inner part on the wheel hub.

Further embodiments of the invention are obtained by virtue of the ratios in column 8 according to table 1, below, quoted as minimum values, which ratios, up to the time at which the invention was made, are not realized on wheel bearing units of the prior art. The values are examples drawn from the characteristic values of an illustrative embodiment of the invention which are recorded in columns 1 to 7 according to line 2 and are designated in line 1.

Figure 1:
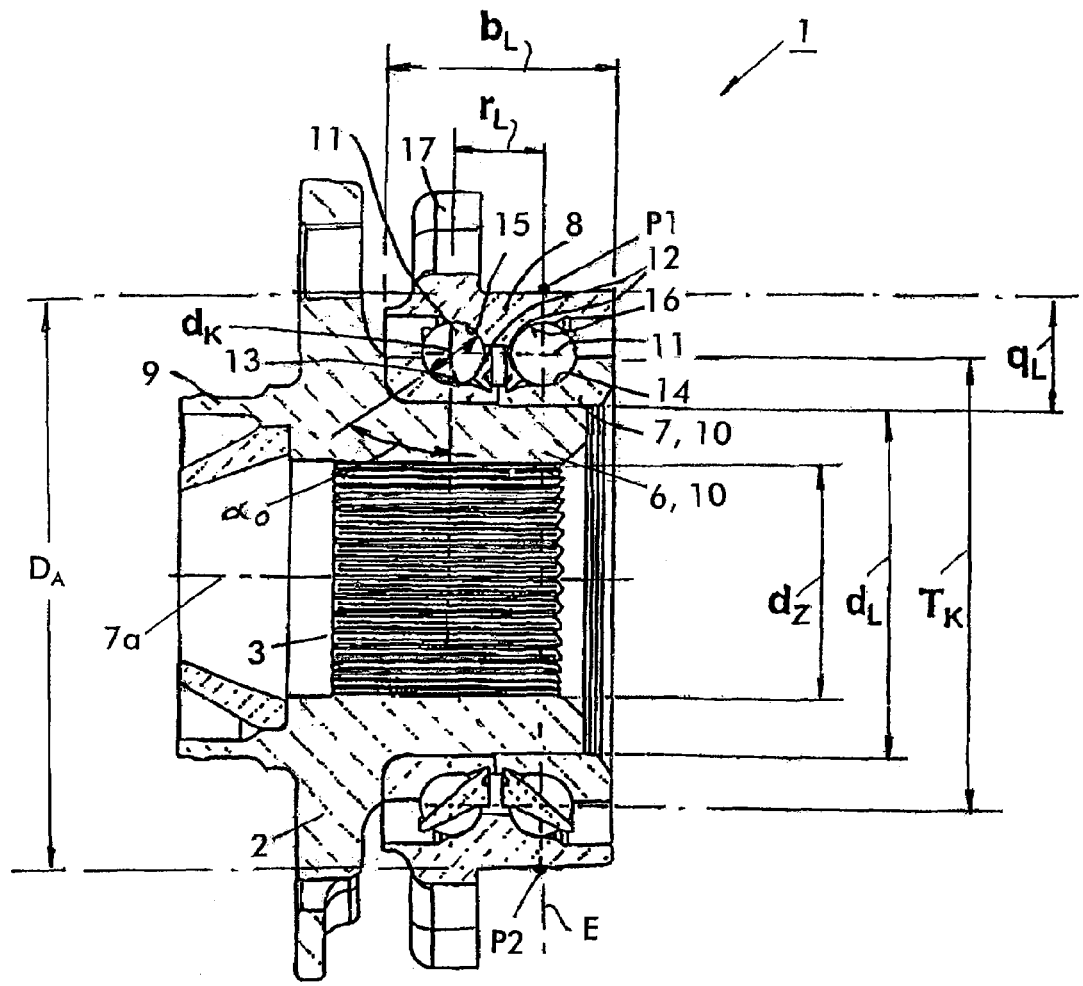
FIG. 1 shows an illustrative embodiment of the invention in which a wheel bearing unit 1 has a wheel hub 2 having an inner toothing 3, specifying the characteristic values essential to the invention.
Figure 2:
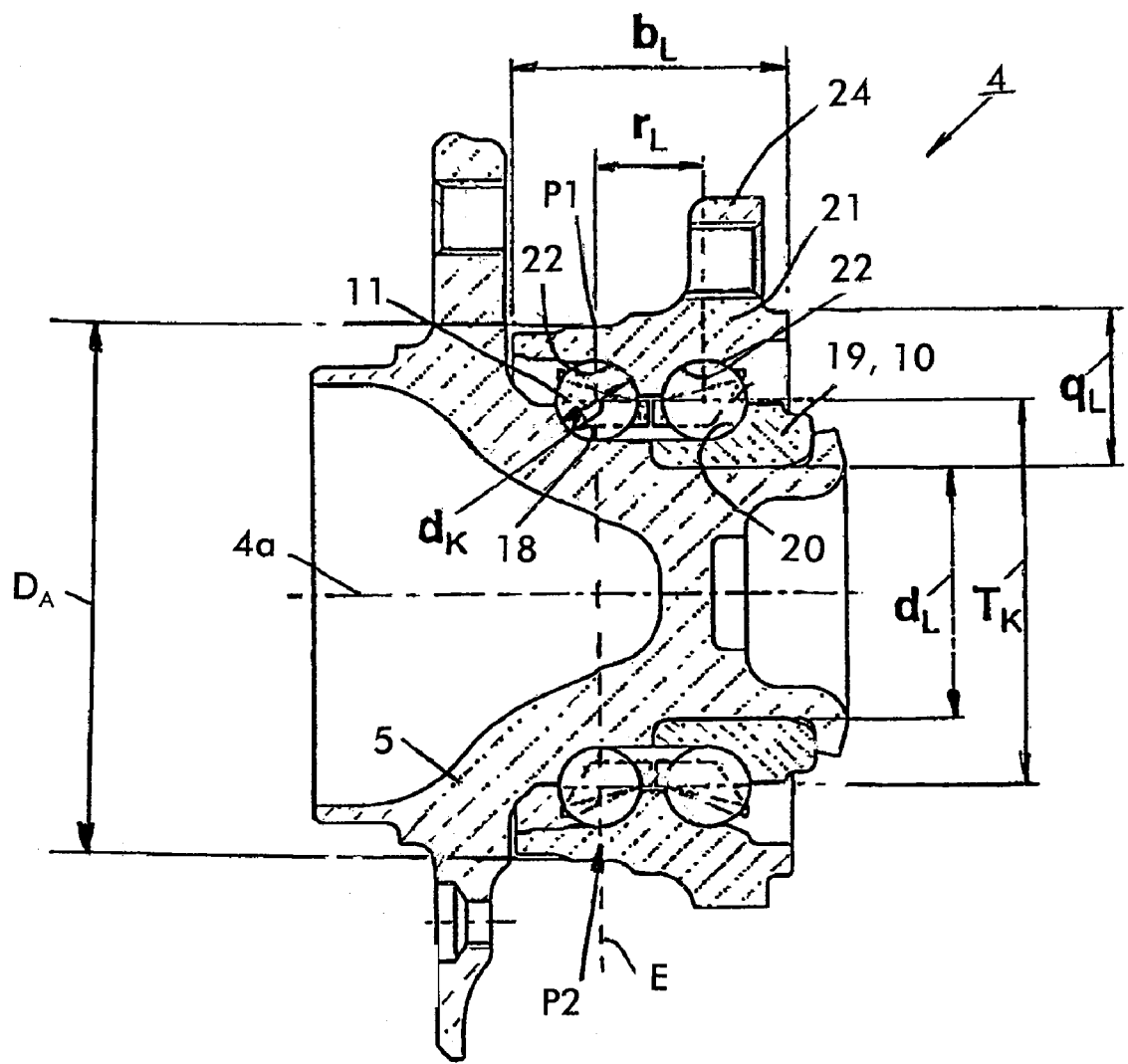
FIG. 2 shows a further illustrative embodiment of a wheel bearing unit 4 having a wheel hub 5, specifying the characteristic values essential to the invention.

All representations are in a longitudinal section along the rotation axes 1a and 4a of the wheel bearing units 1 and 4 respectively and are not to scale.

DETAILED DESCRIPTION OF THE INVENTION

The inner toothing 3 on the wheel hub 2 is designed for engagement in an outer toothing of a drive journal (not represented). The wheel hub 2 is mounted rotatably in the outer part 8 and has a flange 9 for the fastening of a vehicle wheel (not represented) and of a brake disk. On the wheel hub 2 are seated the inner parts 10 in the form of inner rings 6 and 7, which respectively have an outer raceway 13 and 14 for the rolling contact with a respective row of rolling elements 11 in the form of balls. The rolling elements 11 of a row are guided in a cage 12. The outer part 8 replaces as a flange element the traditional outer ring(s) and has, for this purpose, the inner raceways 15 and 16 for the rolling contact with the rolling elements 11. The outer part 8 is provided with a flange 17 for the vehicle-sided fastening of the wheel bearing unit 1.

The wheel bearing unit 4 for non-driven wheels has a wheel hub 5 on which an inner raceway 18 for a row of rolling elements 11 is configured. On the wheel hub 5 is seated an inner ring 19 as the inner part 10, which has a further inner raceway 20 for further rolling elements 11. The outer part 21 of the wheel bearing unit 4 is configured in one piece with the inner raceways 22 and 23 and has a flange 24 for the vehicle-sided fastening.

The invention claimed is:

1. A wheel bearing unit having at least one outer part, at least one inner part and at least two rows of rolling elements between the outer part and the inner part, on the outer part at least one inner raceway, and on the inner part at least one outer raceway for the rolling elements of a row, wherein a ratio of the pitch circle diameter ($T_K$) of at least one row of the wheel bearing unit to the diameter ($d_K$) of the rolling elements of the respective row is greater than the numerical value six, the pitch circle being an imaginary circle which is concentric to the rotation axis of the wheel bearing unit and which, on the peripheral side, joins the centers of the rolling elements of a row.

2. The wheel bearing unit as claimed in claim 1, wherein the row spacing ($r_L$) between the rows corresponds to at least 1.22 times the diameter ($d_K$) of the rolling elements, the row spacing ($r_L$) being the axial distance ($r_L$), equidirectional with the rotation axis, between the centers of the rolling elements.

3. The wheel bearing unit as claimed in claim 2 further comprising a wheel hub, the wheel hub having an inner tooth-

TABLE 1

| | 1 | 2 | 3 | 4 | 5 | 6 | 7 | 8 | | | | | |
|---|---|---|---|---|---|---|---|---|---|---|---|---|---|
| 1 | $d_L$ [mm] | $d_Z$ [mm] | $d_K$ [mm] | $b_L$ [mm] | $r_L$ [mm] | $q_L$ [mm] | $T_K$ [mm] | $d_L/b_L$ | $d_L/d_K$ | $d_L/r_L$ | $d_L/q_L$ | $d_Z/b_L$ | $b_L/q_L$ |
| 2 | 62 | 42 | 11, 112 | 40, 45 | 16 | 20 | 80, 4 | 1, 5 | 5, 6 | 3, 9 | 3, 1 | >1 | 3, 9 | ing, projecting radially inward in the direction of the rotation axis, for engagement in an outer toothing on a drive journal and being at least coupled in a rotationally fixed manner to the outer raceway, wherein the diameter ($d_Z$) of the tip circle of the inner toothing is at least equally as large as the axial bearing width ($b_L$) of the outer part, the axial bearing width ($b_L$) being the maximum distance ($b_L$), equidirectional with the rotation axis, between two outer contour points on the outer part which are distanced axially farthest apart.

4. The wheel bearing unit as claimed in claim 1, wherein the axial bearing width ($b_L$) of the outer part is at least three times the diameter ($d_K$) of the smallest rolling elements of the wheel bearing unit, the axial bearing width ($b_L$) being the maximum distance ($b_L$), equidirectional with the rotation axis, between two outer contour points on the outer part which are distanced axially farthest apart.

5. The wheel bearing unit as claimed in claim 4 further comprising a wheel hub, the wheel hub having an inner toothing, projecting radially inward in the direction of the rotation axis, for engagement in an outer toothing on a drive journal and being at least coupled in a rotationally fixed manner to the outer raceway, wherein the diameter ($d_Z$) of the tip circle of the inner toothing is at least equally as large as the axial bearing width ($b_L$) of the outer part, the axial bearing width ($b_L$) being the maximum distance ($b_L$), equidirectional with the rotation axis, between two outer contour points on the outer part which are distanced axially farthest apart.

6. The wheel bearing unit as claimed in claim 1, wherein the bearing cross section corresponds to at least 1.5 times the diameter ($d_K$) of the smallest rolling elements of the wheel bearing unit, the bearing cross section ($q_L$) being the radial distance ($q_L$), directed transversely to the rotation axis, which is obtained from a difference between the smallest external dimension of the outer part and the free internal diameter of the bearing bore ($d_L$), and the smallest external dimension being the radial distance between two points on the outer contour, which points are situated one opposite the other on the rotation axis in an imaginary radial plane running through the centers of the rolling elements.

7. The wheel bearing unit as claimed in claim 6 further comprising a wheel hub, the wheel hub having an inner toothing, projecting radially inward in the direction of the rotation axis, for engagement in an outer toothing on a drive journal and being at least coupled in a rotationally fixed manner to the outer raceway, wherein the diameter ($d_Z$) of the tip circle of the inner toothing is at least equally as large as the axial bearing width ($b_L$) of the outer part, the axial bearing width ($b_L$) being the maximum distance ($b_L$), equidirectional with the rotation axis, between two outer contour points on the outer part which are distanced axially farthest apart.

8. The wheel bearing unit as claimed in claim 1 further comprising a wheel hub, the wheel hub having an inner toothing, projecting radially inward in the direction of the rotation axis, for engagement in an outer toothing on a drive journal and being at least coupled in a rotationally fixed manner to the outer raceway, wherein the diameter ($d_Z$) of the tip circle of the inner toothing is at least equally as large as the axial bearing width ($b_L$) of the outer part, the axial bearing width ($b_L$) being the maximum distance ($b_L$), equidirectional with the rotation axis, between two outer contour points on the outer part which are distanced axially farthest apart.

\* \* \* \* \*